March 1, 1927.
C. BETHEL
1,619,397
RAILWAY MOTOR MOUNTING
Filed April 7, 1922   2 Sheets-Sheet 1
Fig.1.
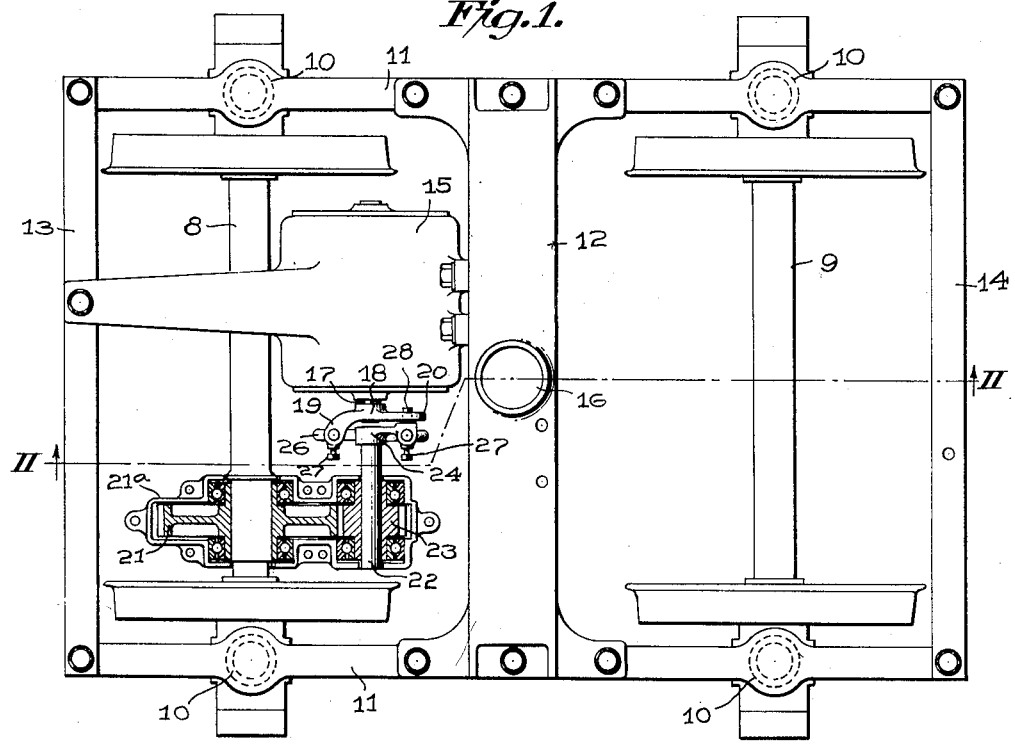
Fig.2.
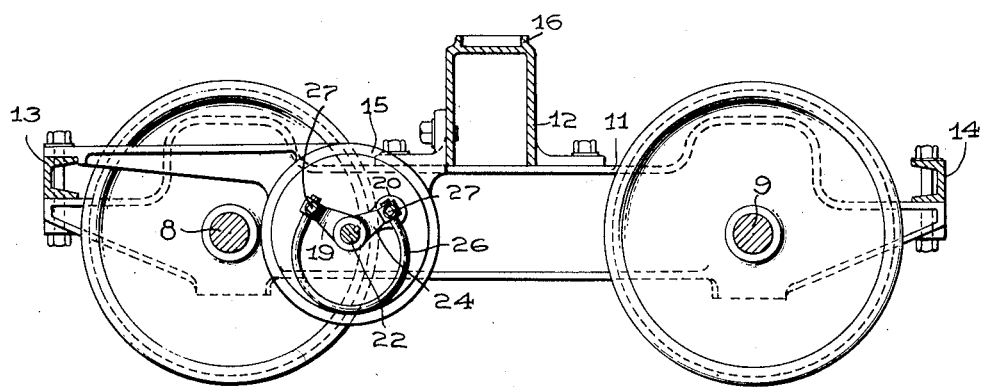
Fig.3.      Fig.4.
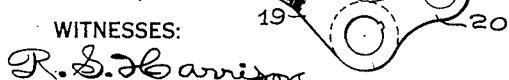
WITNESSES:
R. S. Harrison
A. Martin
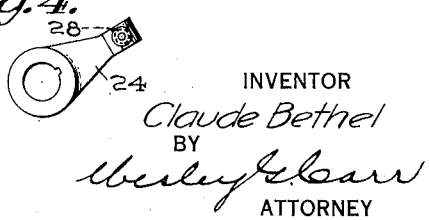
INVENTOR
Claude Bethel
BY
Wesley L. Carr
ATTORNEY March 1, 1927. 1,619,397
C. BETHEL
RAILWAY MOTOR MOUNTING
Filed April 7, 1922   2 Sheets-Sheet 2
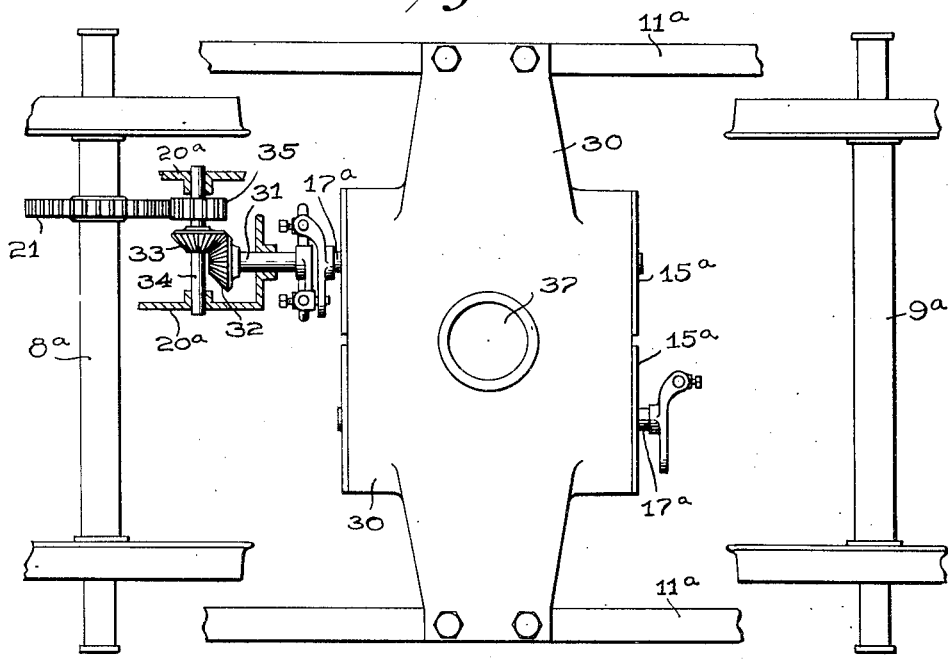
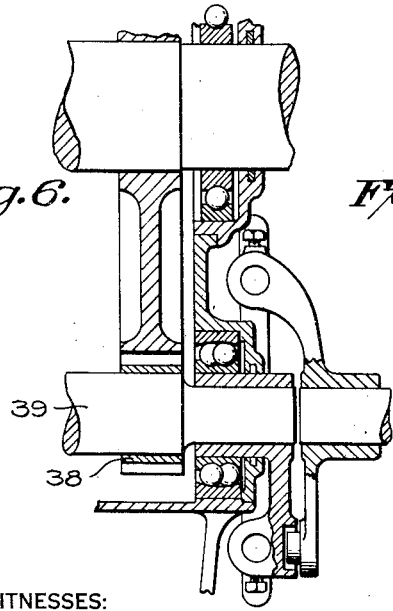
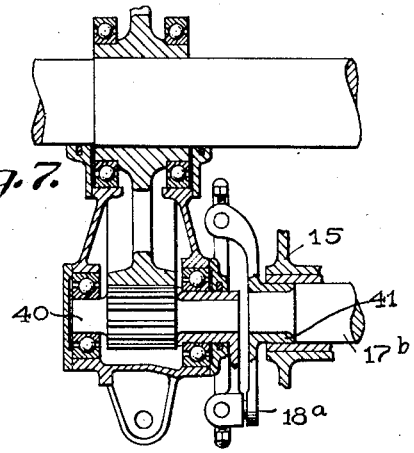
WITNESSES:
INVENTOR
Claude Bethel
BY
ATTORNEY Patented Mar. 1, 1927.

1,619,397

UNITED STATES PATENT OFFICE.

CLAUDE BETHEL, OF WILKINSBURG, PENNSYLVANIA, ASSIGNOR TO WESTINGHOUSE ELECTRIC AND MANUFACTURING COMPANY, A CORPORATION OF PENNSYLVANIA.

RAILWAY-MOTOR MOUNTING.

Application filed April 7, 1922. Serial No. 550,259.

My invention relates to vehicle-driving connections and particularly to means for mounting a driving motor on a railway vehicle and to the manner in which a driving connection is effected between such motor and the traction wheels.

My invention has for one of its objects the provision of means whereby a motor may be suspended from the spring-supporting frame of a vehicle for effective driving connection to the traction wheels upon which the frame is carried.

Another object of my invention is to provide an improved form of driving connection between the motor and the traction wheels.

A still further object of my invention is to provide means whereby the transmission mechanism and the motor may be mounted in the vehicle as separate units, and wherein the motor casing may comprise a portion of the vehicle frame.

As shown in the accompanying drawings, Figure 1 is a view, partially in plan and partially in section, of a railway truck embodying my invention, Fig. 2 is a view taken on the lines II—II of Fig. 1, Figs. 3 and 4 are enlarged detail views of a portion of the driving connections, Fig. 5 is a view similar to Fig. 1 showing my invention in a modified form, and Figs. 6 and 7 are enlarged detail views of different forms of driving connections between the motor shaft and the gears.

The apparatus comprises traction wheels that are mounted upon axles 8 and 9 that serve to support, through springs 10, side frames 11 which, together with transoms or cross-ties 12, 13 and 14, constitute the truck frame. The transom 12 is provided with an upstanding portion 16 to serve as a support for a car-body bolster (not shown).

A motor 15 is provided with a casing that is bolted to the cross-ties 12 and 13, in the manner shown more clearly in Figure 1. The motor 15 is provided with a shaft 17 to which is secured an arm 18 that has extensions 19 and 20.

A two-part gear case 21a, the lower part of which is illustrated in Fig. 1, is carried by the axle 8. This gear case is provided with bearings for a gear wheel 21 that is rigidly secured to the rotatable axle 8. The gear case 21a is also provided with bearings for supporting a shaft 22 that carries a pinion 23.

The shaft 22, is provided, at its inner end, with an arm 24. The outer end of the arm 24, and the extension 19 of the arm 18 (Figs. 2 and 3) are connected by a resilient driving element 26 of spring steel, the opposite ends of which extend through holes in the respective arms and are secured thereto by set screws 27.

The extension 20 of the arm 18 is provided with a relatively large hole through which extends a pin 28 (Fig. 1) that is secured in the outer end of the arm 24. The loose connection afforded by the pin 28 and the extension 20 limits the amount of deflection that may occur in the spring member 26 under driving strains.

From the foregoing it will be apparent that, by detaching one end of the spring element 26, either the motor or the transmission mechanism to which it is connected may be removed as a unit without disturbing the other unit and that no binding strains will occur in the driving connections through the rise and fall of the vehicle frame upon its springs 10, owing to the relative movement permitted by the yielding connection above described.

Furthermore, it will be understood that the yielding connection dampens the force of shocks which occur under excessive driving strains, and that the motor 15 may have springs interposed between it and the truck effecting a further dampening of forces arising from running over rough track, etc.

While I have shown and described driving apparatus in connection with only the axle 8, it will be apparent that a duplicate arrangement of motor and driving connections may be provided for the axle 9.

In the arrangement shown in Fig. 5, a pair of motors 15a are disposed longitudinally of the frame, instead of transversely thereof, as in Fig. 1. These motors are provided with a casing 30, the opposite ends of which are secured to side frames 11a and which serves as a crosstie or transom.

The motors are each provided with an armature shaft 17a that is connected to a pinion shaft 31 in substantially the same manner as the shaft 17 is connected to the shaft 22 in Fig. 2, and any further detailed description of this connection is, therefore, unnecessary.

The shaft 31 carries a pinion 32 that drives a beveled gear 33 which is mounted upon a shaft 34. The shafts 31 and 34 are supported in the walls of a gear case 20a that may comprise top and bottom portions as is the gear case of Fig. 1.

The shaft 34 carries a pinion 35 that drives a gear 21 which is secured to the axle 8a.

The motor casing 30 is provided with a boss 37 that may serve as a support for a body bolster of a car body (not shown).

It will be understood that another motor 15a may drive the axle 9a through connections like those to the axle 8a, just described, and that the gear cases and the transmission mechanism in the form of device shown in Fig. 5 may be removed independently of the motors, in the same manner as the gear case and transmission mechanism of Fig. 1.

The structures illustrated in Figs. 6 and 7 differ from the structure of Fig. 1, in the arrangement of the pinion and the manner in which it is supported in its bearings. In Fig. 6, the pinion proper consists of an ordinary toothed ring 38 that is secured to a shaft 39, the shaft 39 being directly supported in the bearings instead of being supported therein through the sleeve-like extensions of the pinion 23, shown in Fig. 1. The pinion of Fig. 7 comprises a shaft 40 that is provided with an enlarged middle portion upon which pinion teeth are cut.

A further distinction, which is present in Fig. 7, resides in the provision of the motor shaft 17b with a reduced portion over which a sleeve-like extension 41 of the arm 18a extends, so that both the arm 18a and the shaft 17b are supported directly by the bearing in the wall of the motor 15.

While I have shown and described a particular form of my invention, changes may be effected therein without departing from the spirit and scope thereof, as set forth in the appended claims.

I claim as my invention:

1. In a railway vehicle, the combination with an axle and a frame yieldingly supported thereby, of a driving motor carried by the frame, a pinion shaft, a gear wheel secured to the axle, and a resilient connection between the said pinion shaft and the driving motor, said resilient connection comprising a segment spring secured at its respective ends.

2. In a railway vehicle, the combination with an axle and a frame yieldingly supported thereby, of a driving motor carried by the frame, a pinion shaft, a pinion and a gear wheel supported by the axle, and a resilient connection comprising a segment spring secured at its respective ends to the motor shaft and the pinion shaft.

3. In a railway vehicle, the combination with an axle, and a frame yieldingly supported thereby, of a driving motor carried by the frame, a pinion shaft, a pinion and a gear wheel supported by the axle, and a detachable ring-shaped yielding connection between the motor shaft and the pinion shaft, the pinion, the gear wheel and the pinion shaft being included in a unitary structure that may be removed from the said frame without disturbing the motor.

4. In a railway vehicle, the combination with an axle and a frame yieldingly supported thereby, of a driving motor carried by the frame, a pinion shaft, a gear wheel secured to the axle, a pinion for driving the gear wheel, a gear case supported by the axle for enclosing the pinion and the gear wheel and provided with bearings for the pinion and a segmental ring-shaped resilient connection between the motor shaft and the pinion shaft.

5. In a railway vehicle, the combination with an axle and a frame yieldingly supported thereby, of a driving motor disposed longitudinally of the frame, a motor casing secured to the sides of the frame and serving as a cross-tie therefor, a motor shaft, a gear wheel secured to the axle, and a segmental resilient connection between the said motor shaft and the gear wheel.

6. In a railway vehicle, the combination with an axle and a frame yieldingly supported thereby, of a driving motor carried by the frame, a motor shaft, a gear wheel secured to the axle, a yielding connection between the said shaft and the gear wheel, and a supplemental driving connection between the shaft and the gear wheel comprising rigid members having lost-motion engagement.

7. In a railway vehicle, the combination with an axle and a frame yieldingly supported thereby, of a driving motor carried by the frame, a motor shaft, a pinion and a gear wheel supported by the axle, radially extending arms carried by the motor shaft and the pinion shaft respectively, and a circumferentially disposed resilient connecting member for the said arms.

In testimony whereof, I have hereunto subscribed my name this 28th day of March, 1922.

CLAUDE BETHEL.